Oct. 13, 1959     C. S. BURTCHAELL     2,908,362
LUGGAGE HANDLE
Original Filed May 2, 1955
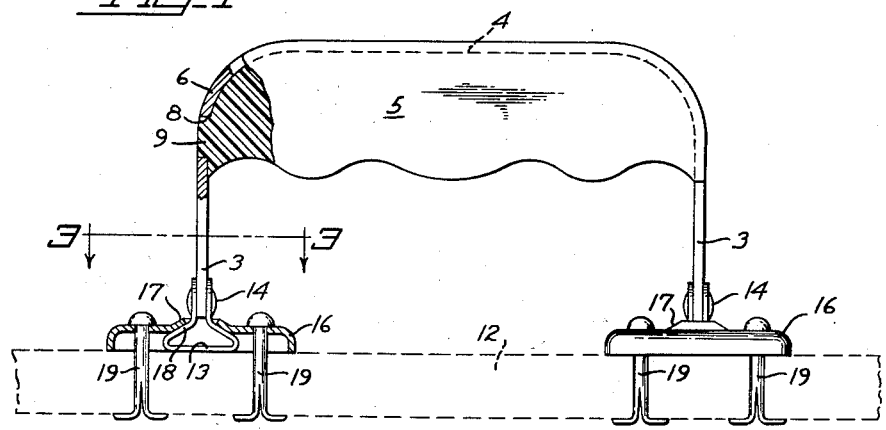
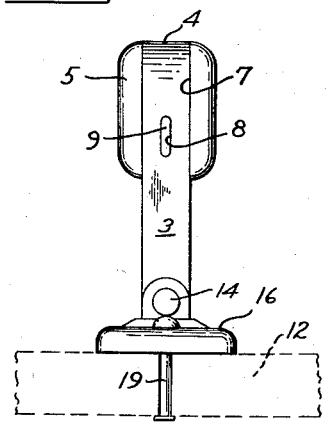
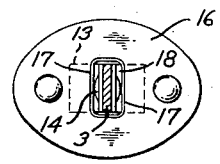
INVENTOR
CLARENCE S. BURTCHAELL
BY *Charles J. Evans*
his ATTORNEY

United States Patent Office 2,908,362
Patented Oct. 13, 1959

2,908,362
LUGGAGE HANDLE

Clarence S. Burtchaell, Ross, Calif.

Original application May 2, 1955, Serial No. 505,290, now Patent No. 2,802,552, dated August 13, 1957. Divided and this application June 17, 1957, Serial No. 683,435

2 Claims. (Cl. 190—57)

My invention relates to luggage handles comprised of a bail and a hand grip on the bail. This application is a division of my copending application Serial No. 505,290 filed May 2, 1955, and patented August 13, 1957 as Patent No. 2,802,552.

One of the objects of my invention is the provision of improved means for securing the grip to the bail.

Another object is the provision of a luggage handle of appealing appearance, and made of simple parts quickly assembled and applied.

Other objects will be brought out in the following description of the invention. I do not limit myself to the showing made by said description and the drawings, since I may use variant forms of the invention within the scope of the appended claims.

Referring to the drawings:

Fig. 1 is a side elevation of my handle as applied to a piece of luggage of which only a top wall is shown. A portion of the handle is broken away, the better to disclose the structure.

Fig. 2 is an end elevation of my handle.

Fig. 3 is a top view of the fastening means taken in the plane 3—3 of Fig. 1.

My luggage handle is composed of two main elements; the grip shaped and conditioned for the hand; and a U-shaped bail in inverted position. The bail is made of a long narrow strip of spring metal with its ends 3 forming the sides of the U, joining the flat middle or top portion 4 of the U in easy curves 6 as shown.

The top part 4 of the bail and the curved portions 6 of its sides lie flush in a complementary groove 7 formed in the upper and end portions of the grip 5. An elongated recess 8 in each side of the bail is snugly engaged by a lug 9 formed integrally with the grip and extending from the bottom of the groove at each end of the grip.

The grip is assembled in the bail by spreading the sides to seat the top of the bail in the groove across the upper edge of the grip, and then releasing the sides of the bail to engage the lugs. The grip is thus held interlocked with the bail by the resilience of the bail; and when my handle is mounted on the wall 12 of the luggage case, the sides of the U are prevented from spreading and the interlock between bail and grip is fixed and secure.

Means are provided for pivotally connecting each end of the bail to the luggage case, such as to the top wall 12. An anchor loop 13 of strip metal, shaped like a wide tread stirrup, is pivotally connected to each end of the bail by a pivot pin 14, the bail lying between the ends of the loop as shown.

The head of the anchor loop is flat and is intended to lie flat against the wall 12, where it is securely held by the dome 16 which may be elliptical in plan. An aperture in the central part of each dome has opposite marginal edges 17, extending upwardly to lie snugly against the slanted sides 18 of the anchor loop as shown. Opposite ends of the dome are apertured to receive the head ends of split rivets 19, thus effecting a distribution of stresses imposed when the luggage is supported from the handle.

I claim:

1. A luggage handle comprising a resilient metal strip forming an inverted U-shape bail, each side of the bail having an aperture therein, fastener means for securing each end of the bail to the luggage, a block grooved on three sides to receive the bottom and sides of the bail, and an integral lug on the block interlocked in each aperture of the bail.

2. A luggage handle comprising a resilient metal strip forming an inverted U-shape bail, each side of the bail having an aperture therein, a block grooved on three sides to receive the bottom and sides of the bail, and an integral lug on the block interlocked in each aperture of the bail.

References Cited in the file of this patent

UNITED STATES PATENTS

| | | |
|---|---|---|
| 2,294,197 | Moore et al. | Aug. 25, 1942 |
| 2,802,552 | Burtchaell | Aug. 13, 1957 |